(12) United States Patent
Choroszylow et al.

(10) Patent No.: US 6,499,301 B1
(45) Date of Patent: *Dec. 31, 2002

(54) ROTARY POSITIVE DISPLACEMENT DEVICE

(76) Inventors: Ewan Choroszylow, 125 Church St., East Aurora, NY (US) 14052; Giovanni Aquino, 29 Byron Ave., Kenmore, NY (US) 14223; Howard J. Greenwald, 111 Hickory Ridge Rd., Rochester, NY (US) 14625

( * ) Notice: Subject to any disclaimer, the term of this patent is extended or adjusted under 35 U.S.C. 154(b) by 0 days.

This patent is subject to a terminal disclaimer.

(21) Appl. No.: 09/416,291

(22) Filed: Oct. 14, 1999

Related U.S. Application Data (63) Continuation-in-part of application No. 09/396,034, filed on Sep. 15, 1999, which is a continuation-in-part of application No. 09/181,307, filed on Oct. 28, 1998, now abandoned.

(51) Int. Cl.$^7$ .................................................. F02C 1/00
(52) U.S. Cl. ........................................................ 60/726
(58) Field of Search ............................... 60/39.181, 726

(56) References Cited

U.S. PATENT DOCUMENTS

| | | | | |
|---|---|---|---|---|
| 4,271,664 A | * | 6/1981 | Earnest ..................... | 60/39.181 |
| 5,632,143 A | * | 5/1997 | Fisher et al. ............. | 60/39.181 |

* cited by examiner

Primary Examiner—Charles G. Freay
(74) Attorney, Agent, or Firm—Greenwald & Basch LLP; Howard J. Greenwald (57) ABSTRACT

An electric generating system comprised of a micro turbine and a rotary device containing a housing having a curved inner surface with a profile equidistant from a trochoidal curve, an eccentric mounted on a shaft disposed within the housing, a rotor mounted on the eccentric shaft which contains at least three intersecting faces and a partial bore located at the intersection of adjacent faces, and at least three rollers rotatably mounted within the partial bores of the rotor. Heat from the micro turbine is passed to a boiler, wherein it is used to generate heated liquid and/or heated fluid.

10 Claims, 10 Drawing Sheets

FIG. 20

ROTARY POSITIVE DISPLACEMENT DEVICE

CROSS-REFERENCE TO RELATED PATENT APPLICATIONS

This application is a continuation-in-part of applicants' copending patent application U.S. Ser. No. 09/396,034, filed on Sep. 15, 1999, which in turn was a continuation-in-part of patent application U.S. Ser. No. 09/181,307, filed on Oct. 28, 1998, now abandoned.

FIELD OF THE INVENTION

An apparatus containing at least two trochoidal rotary chamber devices which can be used for compression and expansion of fluid, pumping of liquid, or as a hydraulic motor.

BACKGROUND OF THE INVENTION

In applicants' U.S. Pat. No. 5,431,551, there is disclosed and claimed a rotary device comprised of a housing comprising a curved inner surface with a profile equidistant from a trochoidal curve, an eccentric mounted on a shaft disposed within said first housing, a first rotor mounted on said eccentric shaft which is comprised of a first side, a second side, and a third secodeafis partial bore disposed at the intersection of said second side and said second side, athr seodpartial bore disposed at the intersection of said second side and said thirst side, a thirstsldrle disposed and rotatably mounted within said first solid bore, a second solid roller disposed and rotatably mounted within said second partial bore, and a third solid roller disposed and rotatably mounted within said third partial bore. The rotor is comprised of a front face, a back face, a first side, a second side, and a third side, wherein a first opening is formed between and communicates between said front face and said first side, a second opening is formed between and communicates between said back face and said first side, wherein each of said first opening and said second opening is substantially equidistant and symmetrical between said first partial bore and said second partial bore, a third opening is formed between and communicates between said front face and said second side, a fourth opening is formed between and communicates between said back face and said second side, wherein each of said third opening and said fourth opening is substantially equidistant and symmetrical between said second partial bore and said third partial bore, a fifth opening is formed between and communicates between said front face and said third side, and a sixth opening is formed between and communicates between said back face and said third side, wherein each of said fifth opening and said sixth opening is substantially equidistant and symmetrical between said third partial bore and said first partial bore. Each of said first partial bore, said second partial bore, and said third partial bore is comprised of a centerpoint which, as said rotary device rotates, moves along said trochoidal cure. Each of said first opening, said second opening, said third opening, said fourth opening, said fifth opening, and said sixth opening has a substantially U-shaped cross-sectional shape defined by a first linear side, a second linear side, and an arcuate section joining said first linear side and said second linear side, wherein said first linear side and said second linear side are disposed with respect to each other at an angle of less than ninety degrees, and said substantially U-shaped cross-sectional shape has a depth which is at least equal to its width. The diameter is said first solid roller is equal to the diameter of said second solid roller, and the diameter of said second solid roller is equal to the diameter of said third solid roller. The widths of each of said first opening said second opening, said third opening, said fourth opening, said fifth opening, and said sixth opening are substantially the same, and the width of each of said openings is less than the diameter of said first solid roller. Each of said first side, said second side, and said third side has substantially the same geometry and size and is a composite shape comprised of a first section and a second section, wherein said first section has a shape which is different from said second section.

The entire disclosure of this U.S. Pat. No. 5,431,551, and its drawings and claims, are hereby incorporated by reference into this specification. It is noteworthy that the device of this prior patent requires the presence of " . . . a first solid roller . . . ," " . . . a second solid roller . . . ," and " . . . a third solid roller . . . " In an amendment filed in patent application U.S. Ser. No. 079,152, an argument was advanced that "Even if it be assumed . . . that it would have been obvious to modify the structure of Hoffmann in the manner suggested by the Examiner, the modified structure . . . would not produce a structure comprised of solid rollers, as required by applicants' claims."

Applicants have discovered that the use of such solid rollers in the device of U.S. Pat. No. 5,431,551 causes a substantial amount of wear on both the roller surfaces and the housing.

It is an object of this invention to provide an improved rotary positive displacement device which is as effective as the device of U.S. Pat. No. 5,431,551 but is more durable.

It is an object of this invention to provide an improved rotary positive displacement device which has a lower polar moment of inertia than does the device of U.S. Pat. No. 5,431,551.

SUMMARY OF THE INVENTION

In accordance with this invention, there is provided a rotary device comprised of a housing comprising a curved inner surface with a profile equidistant from a trochoidal curve, an eccentric mounted on a shaft disposed within said first housing, a first rotor mounted on said eccentric shaft which is comprised of a first side, a second side, and a third side, a first partial bore disposed at the intersection of said first side and said second side, a second partial bore disposed at the intersection of said second side and said third side, a third partial bore disposed at the intersection of said third side and said first side, a first hollow roller disposed and rotatably mounted within said first solid bore, a second hollow roller disposed and rotatably mounted within said second partial bore, and a third hollow roller disposed and rotatably mounted within said third partial bore. The rotor is comprised of a front face, a back face, a first side, a second side, and a third side, wherein a first opening is formed between and communicates between said front face and said first side, a second opening is formed between and communicates between said back face and said first side, wherein each of said first opening and said second opening is substantially equidistant and symmetrical between said first partial bore and said second partial bore, a third opening is formed between and communicates between said front face and said second side, a fourth opening is formed between and communicates between said back face and said second side, wherein each of said third opening and said fourth opening is substantially equidistant and symmetrical between said second partial bore and said third partial bore, a fifth opening is formed between and communicates between said front face and said third side, and a sixth opening is formed between and communicates between said back face and said third side, wherein each of said fifth opening and said sixth opening is substantially equidistant and symmetrical between said third partial bore and said first partial bore. Each of said first partial bore, said second partial bore, and said third partial bore is comprised of a centerpoint which, as said rotary device rotates, moves along said trochoidal cure. Each of said first opening, said second opening, said third opening, said fourth opening, said fifth opening, and said sixth opening has a substantially U-shaped cross-sectional shape defined by a first linear side, a second linear side, and an arcuate section joining said first linear side and said second linear side, wherein said first linear side and said second linear side are disposed with respect to each other at an angle of less than ninety degrees, and said substantially U-shaped cross-sectional shape has a depth which is at least equal to its width. The diameter of said first hollow roller is equal to the diameter of said second hollow roller, and the diameter of said second hollow roller is equal to the diameter of said third hollow roller. The widths of each of said first opening said second opening, said third opening, said fourth opening, said fifth opening, and said sixth opening are substantially the same, and the width of each of said openings is less than the diameter of said first hollow roller. Each of said first side, said second side, and said third side has substantially the same geometry and size and is a composite shape comprised of a first section and a second section, wherein said first section has a shape which is different from said second section.

BRIEF DESCRIPTION OF THE DRAWINGS

The claimed invention will be described by reference to the specification and the following drawings, in which:

DESCRIPTION OF THE PREFERRED EMBODIMENTS

FIGS. 1, 2, 3, 4, 4A, 5, 6, 7, and 8 are identical to the FIGS. 1, 2, 3, 4, 4A, 5, 6, 7, and 8 appearing in U.S Pat. No. 5,431,551; and they are presented in this case to illustrate the similarities and differences between the rotary positive displacement device of such patent and the rotary positive displacement device of the instant application. The entire disclosure, the drawings, the claims, and the abstract of U.S. Pat. No. 5,431,551 are hereby incorporated by reference into this specification.

Referring to FIGS. 1 through 8, and to the embodiment depicted therein, it will be noted that rollers 18, 20, 22, and 24 (see FIGS. 1 and 8) are solid. In the rotary positive displacement device of the instant invention, however, the rollers used are hollow.

Figure 9:
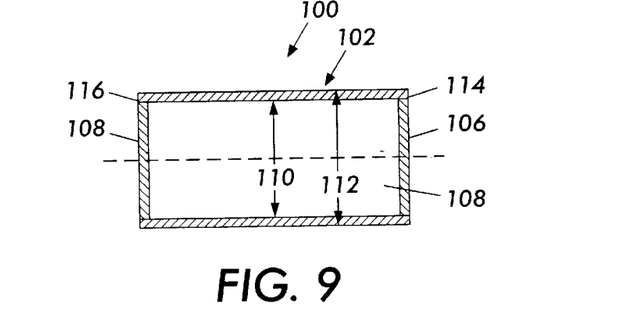
FIG. 9 is a sectional view of one hollow roller which can be used in the rotary positive displacement device of this invention.

FIG. 9 is a sectional view of a hollow roller 100 which may be used to replace the rollers 18, 20, 22, and 24 of the device of FIGS. 1 through 8. In the preferred embodiment a depicted, it will be seen that roller 100 is a hollow cylindrical tube 102 with ends 104 and 106.

Tube 102 may consist of metallic and/or non-metallic material, such as aluminum, bronze, polyethyletherketone, reinforced plastic, and the like. The hollow portion 108 of tube 102 has a diameter 110 which is at least about 50 percent of the outer diameter 112 of tube 102.

The presence of ends 106 and 108 prevents the passage of gas from a low pressure region (not shown) to a high pressure region (not shown). These ends may be attached to tube 102 by conventional means, such as adhesive means, friction means, fasteners, threading, etc.

In the preferred embodiment depicted, the ends 106 and 108 are aligned with the ends 114 and 116 of tube 102. In another embodiment, either or both of such ends 106 and 108 are not so aligned.

In one embodiment, the ends 106 and 108 consist essentially of the same material from which tube 102 is made. In another embodiment, different materials are present in either or both of ends 106 and 108, and tube 102.

In one embodiment, one of ends 106 and/or 108 is more resistant to wear than another one of such ends, and/or is more elastic.

Figure 10:
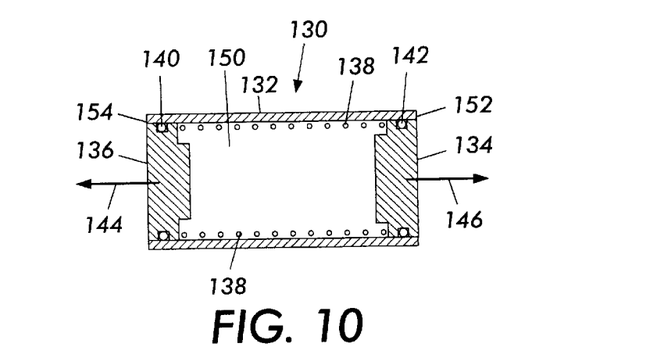
FIG. 10 is a sectional view of another hollow roller which can be used in the rotary positive displacement device of this invention.

FIG. 10 is sectional view of another preferred hollow roller 130, which is comprised of a hollow cylindrical tube 132, end 134, end 136, resilient means 138, and O-rings 140 and 142. In this embodiment, a spring 138 is disposed between and contiguous with ends 134 and 136, urging such ends in the directions of arrows 1444 and 146, respectively. It will be appreciated that these spring-loaded ends tend to minimize the clearance between roller 130 and the housing in which it is disposed; and the O-rings 140 and 142 tend to prevent gas and/or liquid from entering the hollow center section 150.

In the preferred embodiment depicted, the ends 144 and 146 are aligned with the ends 152 and 154 of tube 132. In another embodiment, not shown, one or both of ends 144 and/or 146 are not so aligned.

The resilient means 138 may be, e.g., a coil spring, a flat spring, and/or any other suitable resilient biasing means.

Figure 11:
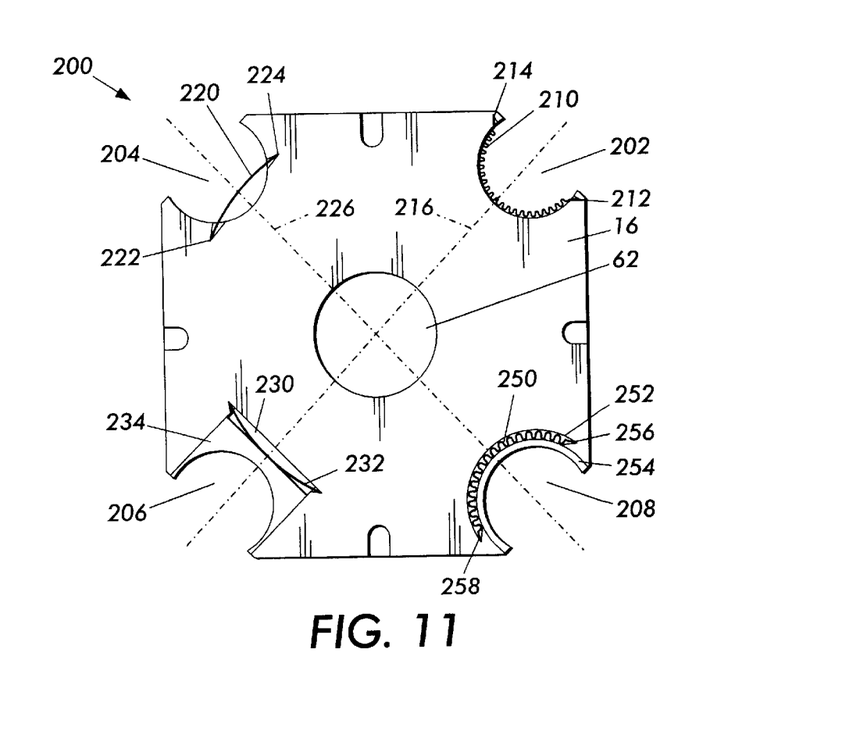
FIG. 11 is a schematic view of a modified rotor which can be used in the positive displacement device of this invention.

FIG. 11 is a schematic view of a rotor 200 which may be used in place of the rotor 16 depicted in FIGS. 1, 5, 6, 7, and 8. Referring to FIG. 11, partial bores 202, 204, 206, and 208 are similar in function, to at least some extent, the partial bores 61, 63, 65, and 67 depicted in FIGS. 5, 6, 7, and 8. Although, in FIG. 11, a different partial bore has been depicted for elements 202, 204, 206, and 208, it will be appreciated that this has been done primarily for the sake of simplicity of representation and that, in most instances, each of partial bores 61, 63, 65, and 67 will be substantially identical to each other.

It will also be appreciated that the partial bores 202, 204, 206, and 208 are adapted to be substantially compliant to the forces and loads exerted upon the rollers (not shown) disposed within said partial bores and, additionally, to exert an outwardly extending force upon each of said rollers (not shown) to reduce the clearances between them and the housing (not shown).

Referring to FIG. 11, partial bore 202 is comprised of a ribbon spring 210 removably attached to rotor 16 at points 212 and 214. Because of such attachment, ribbon spring 210 neither rotates nor slips during use. The ribbon spring 210 may be metallic or non-metallic.

In one embodiment, depicted in FIG. 11, the ribbon spring 210 extends over an arc greater than 90 degrees, thereby allowing it to accept loads at points which are far from centerline 216.

Partial bore 204 is comprised of a bent spring 220 which is affixed at ends 222 and 224 and provides substantially the same function as ribbon spring 210. However, because bent spring extends over an arc less than 90 degrees, it accepts loads primarily at our around centerline 226.

Partial bore 206 is comprised of a cavity 230 in which is disposed bent spring 232 and insert 234 which contains partial bore 206. It will be apparent that the roller disposed within bore 206 (and also within bores 202 and 204) are trapped by the shape of the bore and, thus, in spite of any outwardly extending resilient forces, cannot be forced out of the partial bore. In another embodiment, not shown, the partial bores 202, 204, 206, and 208 do not extend beyond the point that rollers are entrapped, and thus the rollers are free to partially or completely extend beyond the partial bores.

Referring again to FIG. 11, it will be seen that partial bore 208 is comprised of a ribbon spring 250 which is similar to ribbon spring 210 but has a slightly different shape in that it is disposed within a cavity 252 behind a removable cradle 254. As will be apparent, the spring 250 urges the cradle 254 outwardly along axis 226. Inasmuch as the spring 250 extends more than about 90 degrees, it also allows force vectors near ends 256 and 258, which, in the embodiment depicted, are also attachment points for the spring 250.

Figure 12:
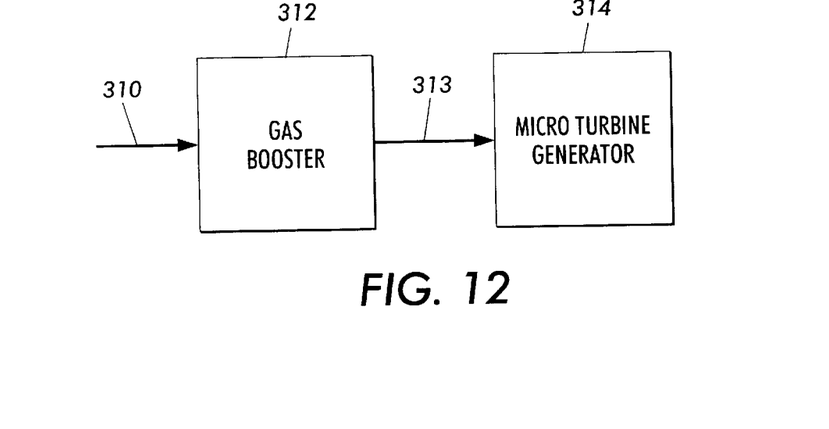
FIG. 12 is a block diagram of a preferred electrical generation system.

FIG. is 12 is a block diagram of one preferred apparatus of the invention. Referring to FIG. 12, it will be seen that gas (not shown) is preferably passed via gas line 310 to gas booster 312 in which it is compressed to pressure required by micro turbine generator 314. In general, the gas must be compressed to a pressure in excess of 30 p.s.i.g., although pressures as low as about 20 p.s.i.g. and as high as 360 p.s.i.g. or more also may be used.

Figure 13:
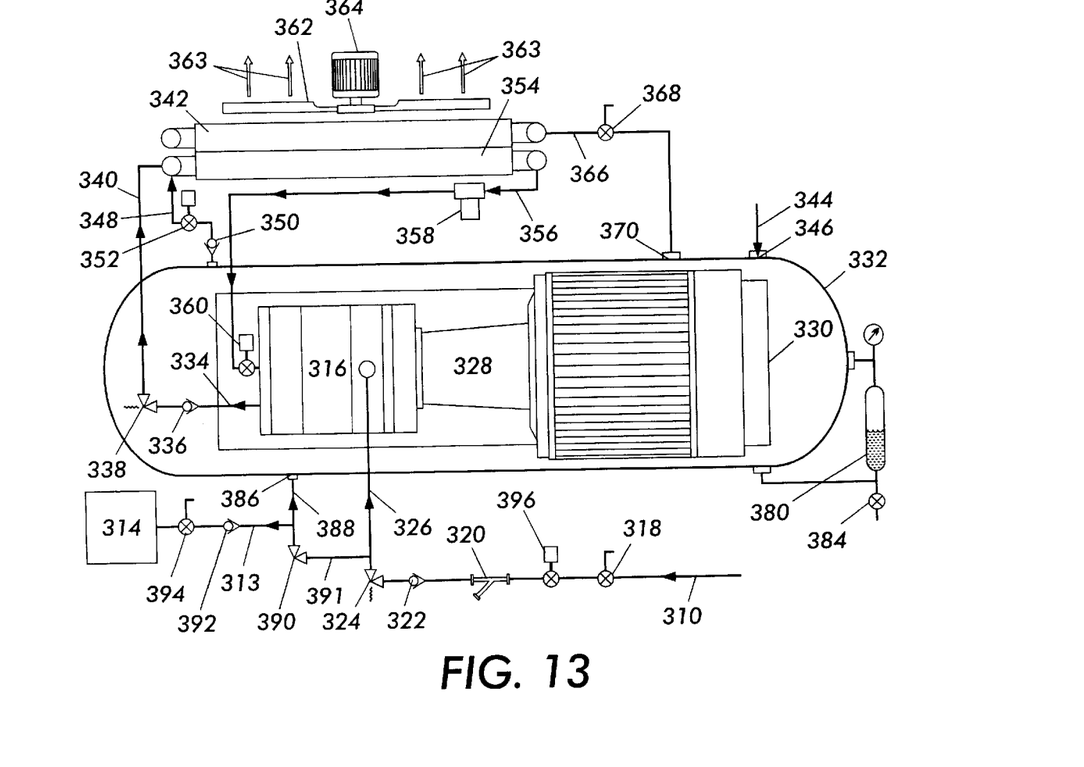
FIG. 13 is a block diagram of the gas booster system of FIG. 12.

In FIGS. 12 and 13, a micro turbine generator 314 is shown as the preferred receiver of the gas via line 313. In other embodiments, not shown, a larger gas turbine and/or a fuel cell may be substituted for the micro turbine generator 314.

In one embodiment, in addition to increasing the pressure of the natural gas, the gas booster 312 also generally increases its temperature to a temperature within the range of from about 100 to about 150 degrees Fahrenheit. In one embodiment, the gas booster 312 increases the temperature of the natural gas from pipeline temperature to a temperature of from about 100 to about 120 degrees Fahrenheit.

The compressed gas from gas booster 312 is then fed via line 313 to micro turbine generator 314. The components used in gas booster 312 and in micro turbine generator 314 will now be described.

FIG. 13 is a schematic diagram of the gas booster system 312 of FIG. 12. Referring to FIG. 12, it will be seen that gas booster system 312 preferably is comprised of a guided rotor compressor 316.

The guided rotor compressor 316 depicted in FIG. 13 is substantially identical to the guided rotor compressor 10 disclosed in U.S. Pat No. 5,431,551, the entire disclosure of which is hereby incorporated by reference into this patent application. This guided rotor compressor is preferably comprised of a housing comprising a curved inner surface with a profile equidistant from a trochoidal curve, an eccentric mounted on a shaft disposed within said housing, a first rotor mounted on said eccentric shaft which is comprised of a first side, a second side, and a third side, a second partial bore disposed at the intersection of said second side and said second side, a second partial bore disposed at the intersection of said second side and said third side, a third partial bore disposed at the intersection of said third side and said first side, a first solid roller disposed and rotatably mounted within said first partial bore, a second solid roller disposed and rotatably mounted within said second partial bore, and a third solid roller disposed and rotatably mounted within said third partial bore.

The rotor is comprised of a front face, a back face, said first side, said second side, and said third side. A first opening is formed between and communicates between said front face and said first side, a second opening is formed between and communicates between said back face and said first side, wherein each of said first opening and said second opening is substantially equidistant and symmetrical between said first partial bore and said second partial bore. A third opening is formed between and communicates between said front face and said second side. A fourth opening is formed between and communicates between said back face and said second side, wherein each of said third opening and said fourth opening is substantially equidistant and symmetrical between said second partial bore and said third partial bore. A fifth opening is formed between and communicates between said front face and said third side. A sixth opening is formed between and communicates between said back face and said third side, wherein each of said fifth opening and said sixth opening is substantially equidistant and symmetrical between said third partial bore and said first partial bore.

Each of said first partial bore, said second partial bore, and said third partial bore is comprised of a centerpoint which, as said rotary device rotates, moves along said trochoidal curve.

Each of said first opening, said second opening, said third opening, said fourth opening, said fifth opening, and said sixth opening has a substantially U-shaped cross-sectional shape defined by a first linear side, a second linear side, and an arcuate section joining said first linear side and said second linear side. The first linear side and the second linear side are disposed with respect to each other at an angle of less than ninety degrees; and said substantially U-shaped cross-sectional shape has a depth which is at least equal to its width.

The diameter of said first roller is equal to the diameter of said second solid roller, and the diameter of said second solid roller is equal to the diameter of said third solid roller.

The widths of each of said first opening, said second opening, said third opening, said fourth opening, said fifth opening, and said sixth opening are substantially the same, and the width of each of said openings is less than the diameter of said first solid roller.

Each of said first side, said second side, and said third side has substantially the same geometry and size and is a composite shape comprised of a first section and a second section, wherein said first section has a shape which is different from that of said second section.

The aforementioned compressor is a very preferred embodiment of the rotary positive displacement compressor which may be used as compressor 316; it is substantially smaller, more reliable, more durable, and quieter than prior art compressors. However, one may use other rotary positive displacement compressors such as, e.g., one or more of the compressors described in U.S. Pat. Nos. 5,605,124, 5,597, 287, 5,537,974, 5,522,356, 5,489,199, 5,459,358, 5,410,998, 5,063,750, 4,531,899, and the like. The entire disclosure of each of these United States patents is hereby incorporated by reference into this specification.

In one preferred embodiment, the rotary positive displacement compressor used as compressor 316 is a Guided Rotor Compressor which is sold by the Phoenix Engine and Compressor Corporation of 210 Pennsylvania Avenue, East Aurora, N.Y.

Referring again to FIG. 13, it will be seen that the compressed gas from compressor 316 is fed via line 313 to micro turbine generator 314. As is disclosed in U.S. Pat. No. 5,810,524 (see, e.g., claim 1 thereof), such micro turbine generator 314 is a turbogenerator set including a turbogenerator power controller, wherein said turbogenerator also includes a compressor, a turbine, a combustor with a plurality of gaseous fuel nozzles and a plurality of air inlets, and a permanent magnet motor generator; see, e.g., FIGS. 1 and 2 of such patent and the description associated with such Figures.

The assignee of U.S. Pat. No. 5,819,524 manufactures and sells micro turbine generators, such as those described in its patent.

Similar micro turbine generators 314 are also manufactured and sold by Elliott Energy Systems company of 2901 S.E. Monroe Street, Stuart, Fla. 34997 as "The TA Series Turbo Alternator."

Such micro turbines are also manufactured by the Northern Research and Engineering Corporation (NREC), of Boston, Mass., which is a wholly-owned subsidiary of Ingersoll-Rand Company; see, e.g., page 64 of the June, 1998 issue of "Diesel & Gas Turbine Worldwide." These micro turbines are adapted to be used with either generators (to produce micro turbine generators) or, alternatively, without such generators in mechanical drive applications. It will be apparent to those skilled in the art that applicants' rotary positive displacement device may be used with either of these applications.

In general, and as is known to those skilled in the art, the micro turbine generator 314 is comprised of a radial, mixed flow or axial, turbine and compressor and a generator rotor and stator. The system also contains a combustor, bearings and bearings lubrication system. The micro turbine generator 314 operates on a Brayton cycle of the open type; see, e.g., page 48 of the June, 1998 issue of "Diesel & Gas Turbine Worldwide."

Referring again to FIG. 13, and in the preferred embodiment depicted therein, it will be seen that natural gas is fed via line 310 to manual ball valve 318 and thence to Y-strainer 320, which removes any heavy, solid particles entrained within the gas stream, The gas is then passed to check valve 322, which prevents backflow of the natural gas. Relief valve 324 prevents overpressurization of the system.

The natural gas is then fed via line 326 to the compressor 316, which is described elsewhere in this specification in detail. Referring to FIG. 13, it will be seen that compressor 316 is operatively connected via distance piece 328, housing a coupling (not shown) which connects the shafts (not shown) of compressor 316 and electric motor 330. The compressor 316, distance piece 328, and electric motor 330 are mounted on or near a receiving tank, which receives and separates a substantial portion of the oil used in compressor 316.

Referring again to FIG. 13, when the compressor 316 has compressed a portion of natural gas, such natural gas also contains some oil. The gas/oil mixture is then fed via line 334 to check valve 336 (which prevents backflow), and thence to relief valve 338 (which prevents overpressurization), and then via line 340 to radiator/heat exchanger 342.

Referring again to FIG. 13, it will be seen that oil is charged into the system via line 344 through plug 346. Any conventional oil or lubricating fluid may be used; in one embodiment, automatic transmission fluid sold as "ATF" by automotive supply houses is used.

A portion of the oil which was introduced via line 344 resides in the bottom of tank 332. This portion of the oil is pressurized by the natural gas in the tank, and the pressurized oil is then pushed by pressurized gas through line 348, through check valve (to eliminate back flow), and then past needle valve 352, into radiator 354; a similar needle valve 352 may be used after the radiator 354. The oil flowing into radiator 354 is then cooled to a temperature which generally is from about 10 to about 30 degrees Fahrenheit above the ambient air temperature. The cooled oil then exits radiator 354 via line 356, passes through oil filter 358, and then is returned to compressor 316 where it is injected; the injection is controlled by solenoid valve 360.

In the preferred embodiment depicted in FIG. 13, a fan 362 is shown as the cooling means; this fan is preferably driven by motor 364; in the preferred embodiment depicted in FIG. 13, air is drawn through radiators 342 and 354 in the direction of arrows 363. As will be apparent to those skilled in the art, other cooling means (such as water cooling) also and/or alternatively may be used.

Referring again to FIG. 13, the cooled oil and gas mixture from radiator 342 is passed via line 366 through ball valve 368 and then introduced into tank 332 at point 370.

In the operation of the system depicted in FIG. 13, a sight gauge 380 provides visual indication of how much oil is in receiving tank 332. When an excess of such oil is present, it may be drained via manual valve 384. In general, it is preferred to have from about 20 to about 30 volume percent of the tank be comprised of oil.

Referring again to FIG. 13, compressed gas may be delivered to turbogenerator 314 through port 386, which is preferably located on receiving tank 332 but above the oil level (not shown) in such tank. Bypass line 388 and pressure relief valve 390 allows excess gas flow to be diverted back into inlet line 326. That gas which is not in bypass line 388 flows via line 313 through check valve 392 (to prevent backflow), manual valve 394 and thence to turbogenerator 314.

Thus, and again referring to FIG. 13, it will be seen that, in this preferred embodiment, there is a turbo alternator 314, an oil lubricated rotary displacement compressor 316, a receiving tank 332, a means 310 for feeding gas to the rotary positive displacement compressor, a means 346 for feeding oil to the receiving tank, a means 342 for cooling a mixture of gas and oil, a means 332 for separating a mixture of gas and oil, and a means 356 for feeding oil to the rotary positive displacement compressor.

In the preferred embodiment depicted in FIG. 13, there are two separate means for controlling the flow capacity of compressor 316. One such means, discussed elsewhere in this specification as a bypass loop, is the combination of port 386, line 388, relief valve 390, and line 391. Another such means is to control the inlet flow of the natural gas by means of control valve 396. As will be apparent, both such means, singly or in combination, exert their control in response to the gas needs of turbogenerator 314.

Figure 14:
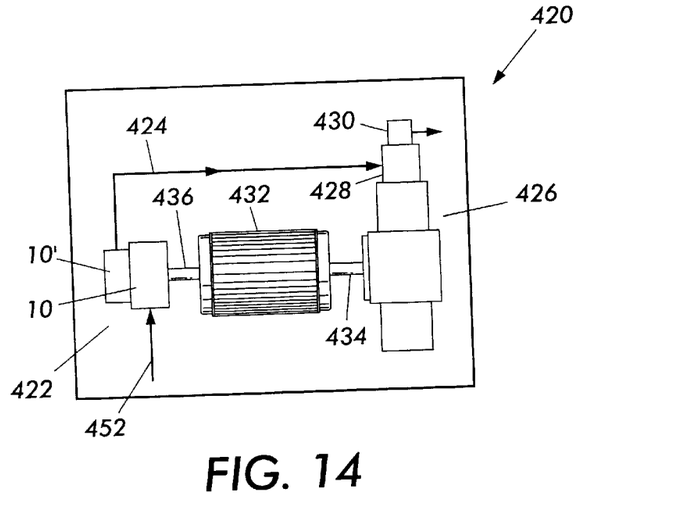
FIG. 14 is a schematic representation of an apparatus comprised of a guided rotor device and a reciprocating compressor.

FIG. 14 is a schematic representation of a hybrid booster system 420 which is comprised of a rotary positive displacement device assembly 422 operatively connected via line 424 to a reciprocating compressor 426.

Rotary positive displacement device assembly 422 may be comprised of one or more of the rotary positive displacement devices depicted in either FIGS. 1–8 (with solid rollers) and/or 9–11 (hollow rollers). Alternatively, or additionally, the displacement device 422 may be comprised of one or more of the rotary compressors claimed in U.S. Pat. No. 5,769,619, the entire disclosure of which is hereby incorporated by reference into this specification.

U.S. Pat. No. 5,769,619 claims a rotary device comprised of a housing comprising a curved inner surface in the shape of a trochoid and an interior wall, an eccentric mounted on a shaft disposed within said housing, a first rotor mounted on said eccentric shaft which is comprised of a first side and a second side, a first pin attached to said rotor and extending from said rotor to said interior wall of said housing, and a second pin attached to said rotor and extending from said rotor to said interior wall of said housing, and a third pin attached to said rotor and extending from said rotor to said interior wall of said housing. A continuously arcuate track is disposed within said interior wall of said housing, wherein said continuously arcuate track is in the shape of an envoluted trochoid. Each of said first pin, said second pin, and said third pin has a distal end which is disposed within said continuously arcuate track. Each of said first pin, said second pin, and said third pin has a distal end comprised of a shaft disposed within a rotatable sleeve. The rotor is comprised of a multiplicity of apices, wherein each such apex forms a compliant seal with said curved inner surface, and wherein each said apex is comprised of a separate curved surface which is formed from a strip of material pressed into a recess. The curved inner surface of the housing is generated from an ideal epictrochoidal curve and is outwardly recessed from said ideal epitrochoidal curve by a distance of from about 0.05 to about 5 times as great as the eccentricity of said eccentric. The diameter of the distal end of each of said first pin and said second pin is from about 2 to about 4 times as great as the eccentricity of the eccentric. Each of the first pin, the second pin, and the third pin extends from beyond the interior wall of the housing by from about 2 to about 2 times the diameter of each of said pins.

Referring again to FIG. 14, it is preferred that several rotary positive displacement devices 10 and 10' be used to compress the gas ultimately fed via line 424 to reciprocating positive compressor 426. As is disclosed in U.S. Pat. No. 5,431,551, the devices 10 and 10' are staged to provide a multiplicity of fluid compression means in series.

Thus, as was disclosed in U.S. Pat. No. 5,431,551 (see lines 62 et seq. of column 9), "In one embodiment, not shown, a series of four rotors are used to compress natural gas. The first two stacked rotors are substantially identical and relatively large; they are 180 degrees out of phase with each other; and they are used to compress natural gas to an intermediate pressure level of from about 150 to about 200 p.s.i.g. The third stacked rotor, which comprises the second stage of the device, is substantially smaller than the first two and compresses the natural gas to a higher pressure of from about 800 to about 1,000 p.s.i.g. The last stacked compressor, which is yet smaller, is the third stage of the device and compresses the natural gas to a pressure of from about 3,600 to about 4,500 p.s.i.g."

Many other staged compressor circuits will be apparent to those skilled in the art. What is common to all of them, however, is the presence of at least one rotary positive displacement device 10 whose output is directly or indirectly operatively connected to at least one cylinder of a reciprocating positive displacement compressor 426.

One may use any of the reciprocating positive displacement compressor designs well known to the art. Thus, by way of illustration and not limitation, one may use one or more of the reciprocating positive compressor designs disclosed in U.S. Pat. Nos. 5,811,669, 5,457,964, 5,411,054, 5,311,902, 4,345,880, 4332,144, 3,965,253, 3,719,749, 3,656,905, 3,585,451, and the like. The entire disclosure of each of these United States patents is hereby incorporated by reference into this specification.

Referring again to FIG. 14, it will be apparent that reciprocating positive displacement compressor 426 may be comprised of one or more stages. In the preferred embodiment depicted, compressor 426 is comprised of stages 428 and 430.

Referring again to FIG. 14, an electric motor 432 connected by shafts 434 and 436 is operatively connected to compressors 428/430 and 10/10'. It will be apparent that many other such drive assemblies may be used.

In one embodiment, not shown, the gas from one stage of either the 10/10' assembly and/or the 428/430 assembly is cooled prior to the time it is passed to the next stage. In this embodiment, it is preferred to cool the gas exiting each stage at least about 10 degrees Fahrenheit prior to the time it is introduced to the next compressor stage.

Figure 15:
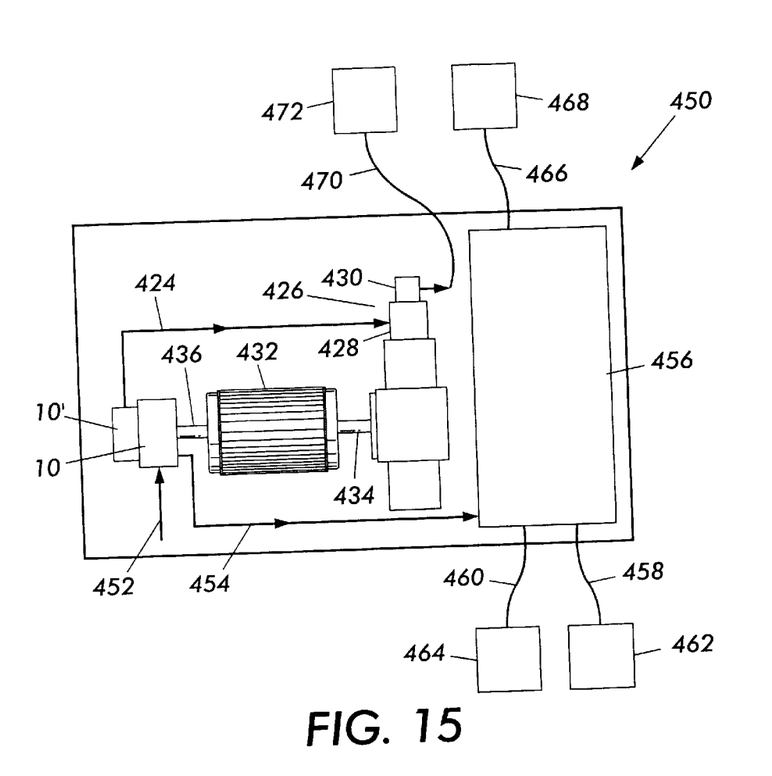
FIG. 15 is a schematic representation of another apparatus comprised of a guided rotor device and a reciprocating compressor.

FIG. 15 depicts an assembly 450 similar to the assembly 420 depicted in FIG. 14. Referring to FIG. 15, it will be seen that gas is fed to compressor assembly 10/10' by line 452. In this embodiment, some pressurized gas at an intermediate pressure is fed from compressor 10 via line 454 to turbine or micro-turbine or fuel cell 456. Alternatively, or additionally, gas is fed to electrical generation assembly 456 by a separate compressor (not shown).

The electrical output from electrical generation assembly 456 is used, at least in part, to power electrical motor 432.

Additionally, electrical power is fed via lines 458 and/or 460 to an electrical vehicle recharging station 462 and/or to an electrical load 464.

Referring again to FIG. 15, and in the preferred embodiment depicted therein, waste heat produced in turbine/microturbine/fuel cell 456 is fed via line 466 to a heat load 468, where the heat can be advantageously utilized, such as, e.g., heating means, cooling means, industrial processes, etc. Additionally, the high pressure discharge from compressor 430 is fed via line 470 to a compressed natural gas refueling system 472.

Figure 16:
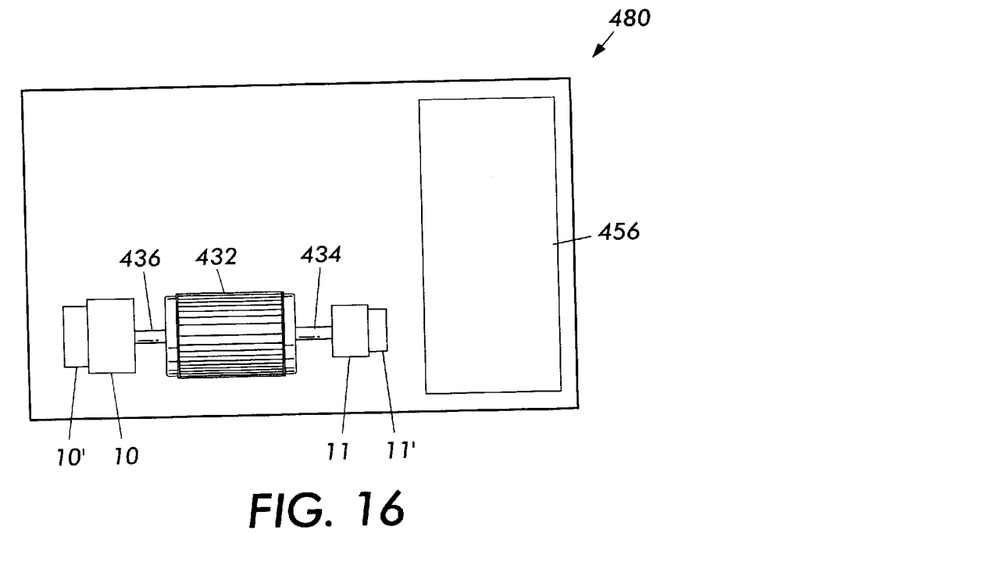
FIG. 16 is a schematic representation of another guided rotor apparatus.

In one embodiment, not shown, guided rotor assembly 10/10' is replaced is conventional compressor means such as reciprocating compressor, or other positive displacement compressor. Alternatively, or additionally, the reciprocating compressor assembly may be replaced by one or more rotary positive displacement devices which, preferably, are adapted to produce a more highly pressurized gas output the either compressor 10 or compressor 10'. Such an arrangement is illustrated in FIG. 16, wherein rotary positive displacement devices 11/11' are are higher pressure compressors used. In one embodiment, not shown, separate electrical motors are used to power one or more different compressors.

Figure 17:
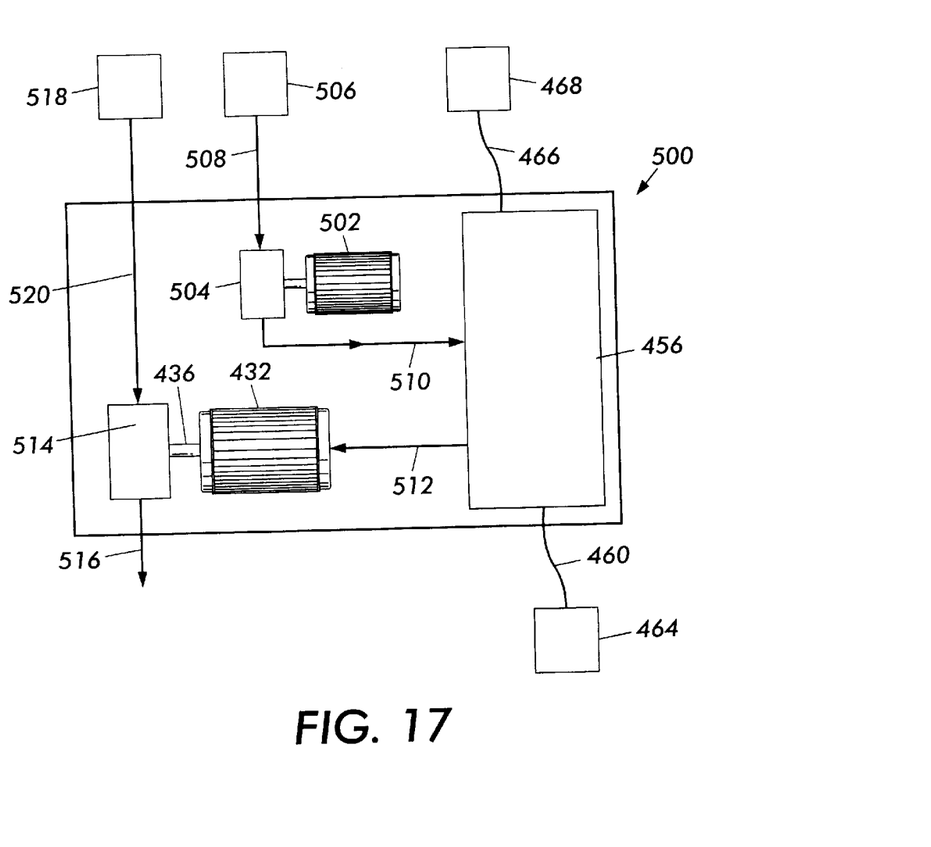
FIG. 17 is a schematic representation of yet another guided rotor apparatus.

FIG. 17 is a schematic representation of an assembly 500 in which electrical generation assembly 456 is used to power a motor 502 which is turn provides power to rotary positive displacement device 504. Gas from well head 506 is passed via line 508, and pressurized gas from rotary positive displacement device 504 is fed via line 510 to electrical generation assembly 456, wherein it is converted to electrical energy. Some of this energy is fed via line 512 to electric motor 432, which provides motive power to a single or multi-compressor guided rotary compressor 514; this "well head booster" may be similar in design to the compressor assembly illustrated in FIGS. 1–8, or to the compressor assembly illustrated in FIGS. 9–12, and it may contain one more compressor stages. The output from rotary positive displacement assembly 514 may be sent via line 516 to gas processing and/or gas transmission lines. The input to rotary positive displacement assembly 514 may come from well head 518, which may be (but need not be) the same well head as well head 516, via line 520.

Multistage Rotor Assembly

Figure 18:
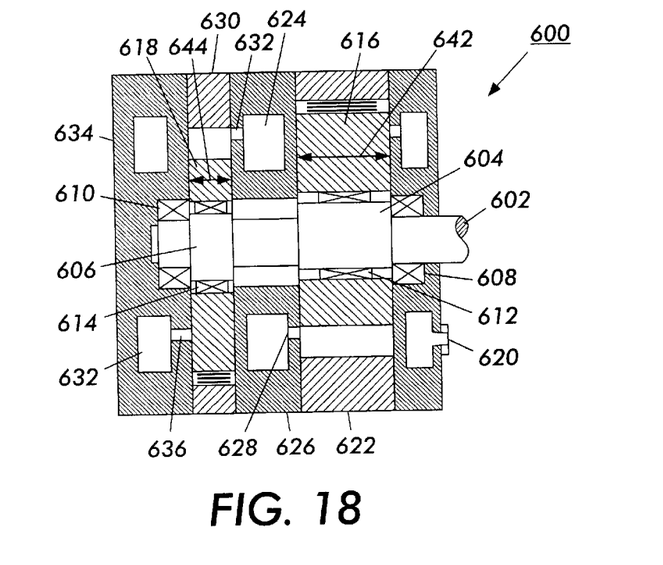
FIG. 18 is a sectional view of a multi-stage guided rotor assembly.

FIG. 18 is a sectional view of a multistage rotor assembly 600 which is comprised of a shaft 602 integrally connected to eccentric 604 and eccentric 606. The rotating shaft 600/eccentric 604/eccentric 606 assembly is supported by main bearings 608 and 610; eccentrics 604 and 606 are disposed within bearings 612 and 614; and the eccentrics 604/606 and bearings 612/614 assemblies are disposed within guided rotors 616 and 618. This arrangement is somewhat similar to that depicted in FIG. 1, wherein eccentric 52 is disposed within guided rotor 60.

As will be apparent to those skilled in the art, one shaft 602 is being used to translate two rotors 616 and 618. The gas to be compressed is introduced into port 620 and then introduced into the volume created by the rotor 616 and the housing 622. The compressed gas from the volume created by the rotor 616 and the housing 622 is then introduced within an annulus 624 within intermediate plate 626 via port 628 and then sent into the volume created by rotor 618 and housing 630 through port 632. After being further compressed in this second rotor system, it is then sent to discharge annulus 632 within discharge housing 634 by port 636.

Figure 1:
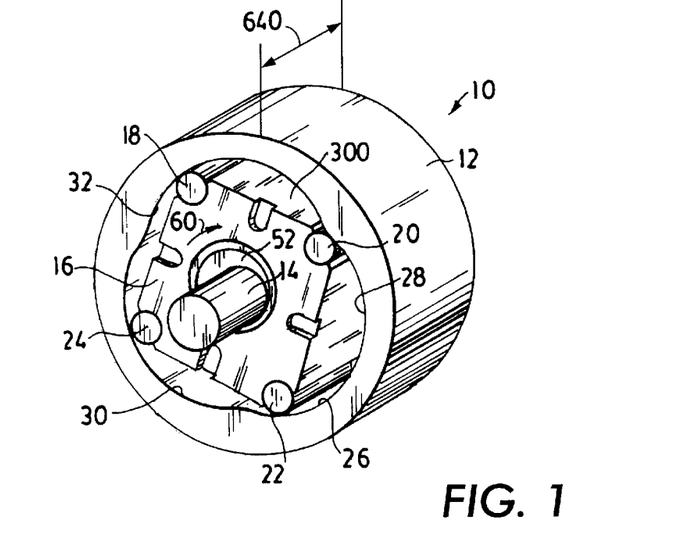
FIG. 1 is a perspective view of one preferred rotary mechanism claimed in U.S. Pat. No. 5,431,551.
Figure 2:
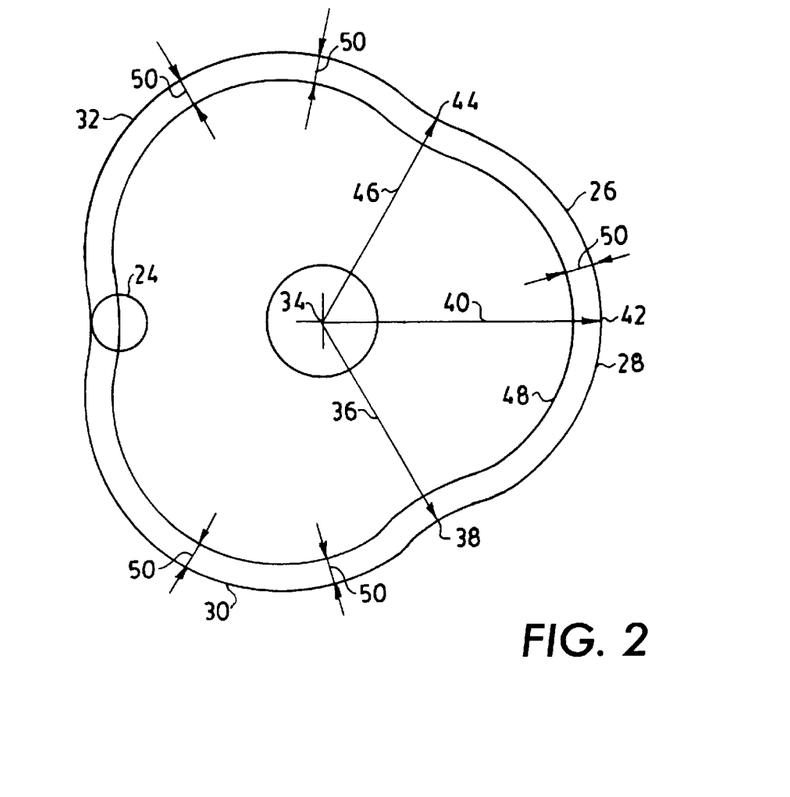
FIG. 2 is an axial, cross-sectional view of the mechanism of FIG. 1.
Figure 3:
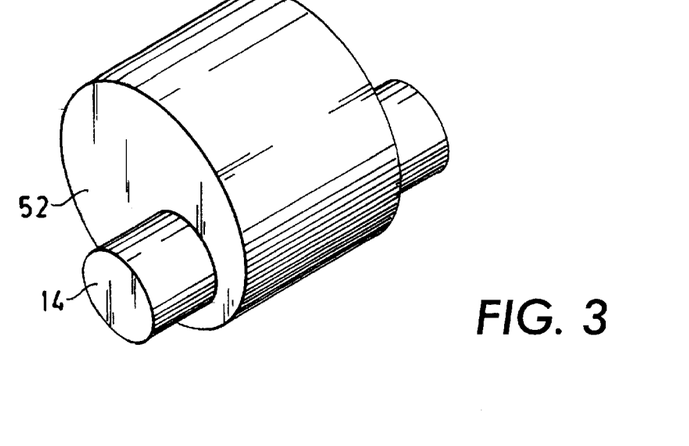
FIG. 3 is a perspective view of the eccentric crank of the mechanism of FIG. 1.
Figure 4:
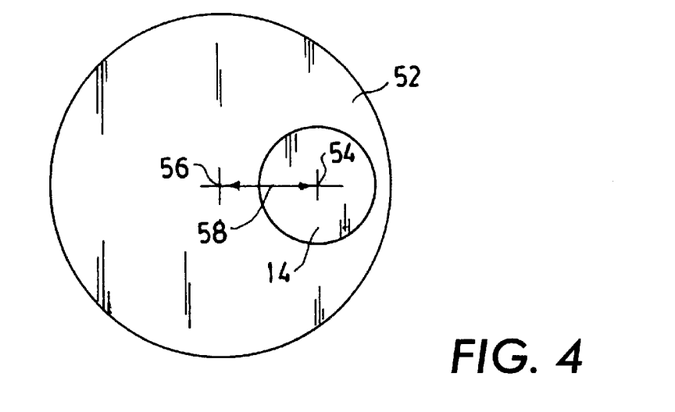
FIG. 4A is a transverse, cross-sectional view of the eccentric crank of FIG. 3.
Figure 4A:
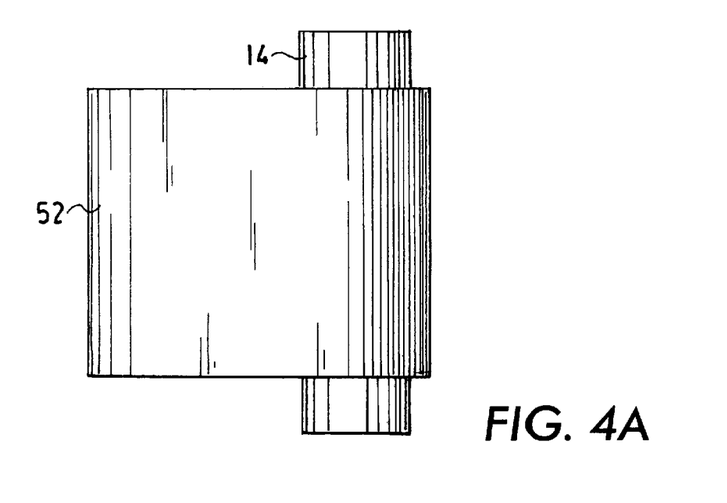
Figure 5:
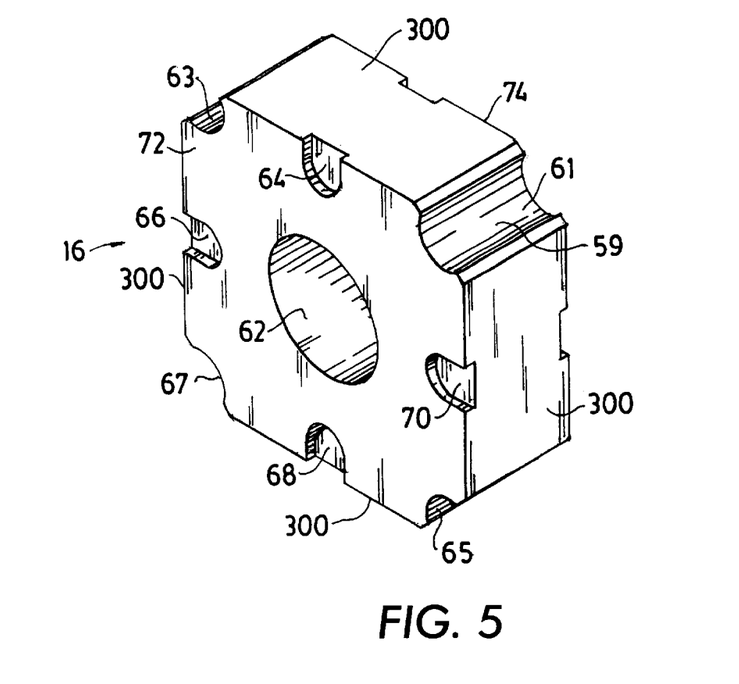
FIG. 5 is a perspective view of the rotor of the device of FIG. 1.
Figure 6:
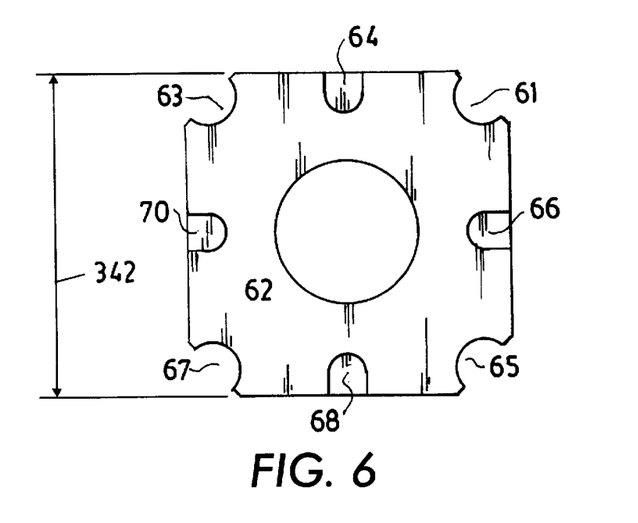
FIG. 6 is an axial, cross-sectional view of the rotor of FIG. 5.
Figure 7:
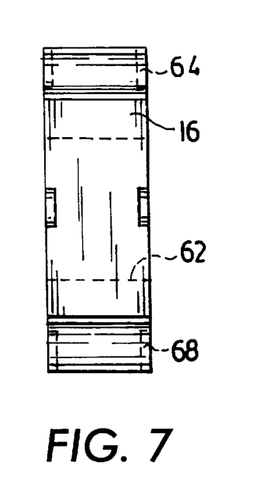
FIG. 7 is a transverse, cross-sectional view of the rotor of FIG. 5.
Figure 8:
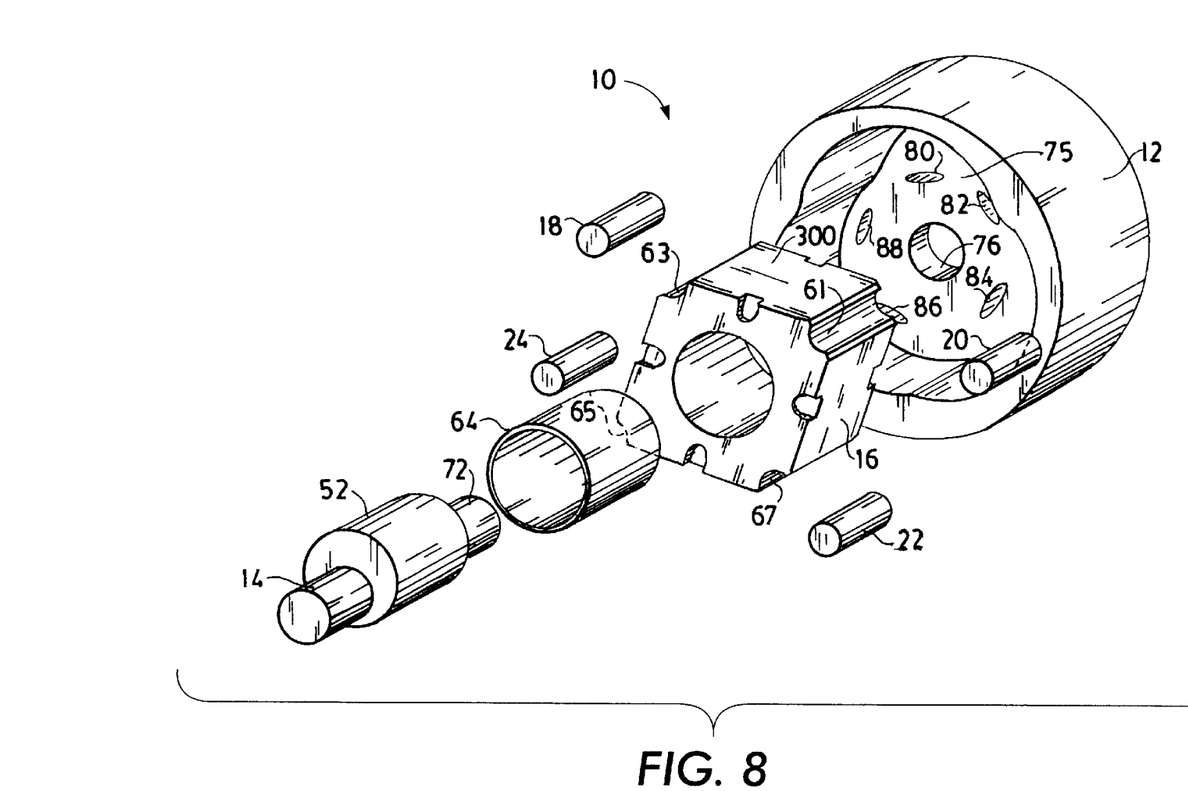
FIG. 8 is an exploded, perspective view of the device of FIG. 1.

Referring to FIG. 1, it will be seen that guided rotor assembly 10 has a housing 12 with a thickness 640 which is slightly larger than the thickness of the rotor 16 disposed within such housing (see FIG. 1). Similarly, the thickness 642 of rotor assembly 616, and the thickness 644 of rotor assembly 618 are also slightly smaller than the thicknesses of the housings in which the guided rotors are disposed.

It is preferred that the thickness 644 be less than the thickness 642. In one embodiment, thickness 642 is at least 1.1 times as great as the thickness 644 and, preferably, at least 1.5 times as great as the thickness 644.

It will be apparent that, with the assembly 600 of FIG. 18, one can achieve higher pressures with lower operating costs.

A Hermetically Sealed Guided Rotor Apparatus

Figure 19:
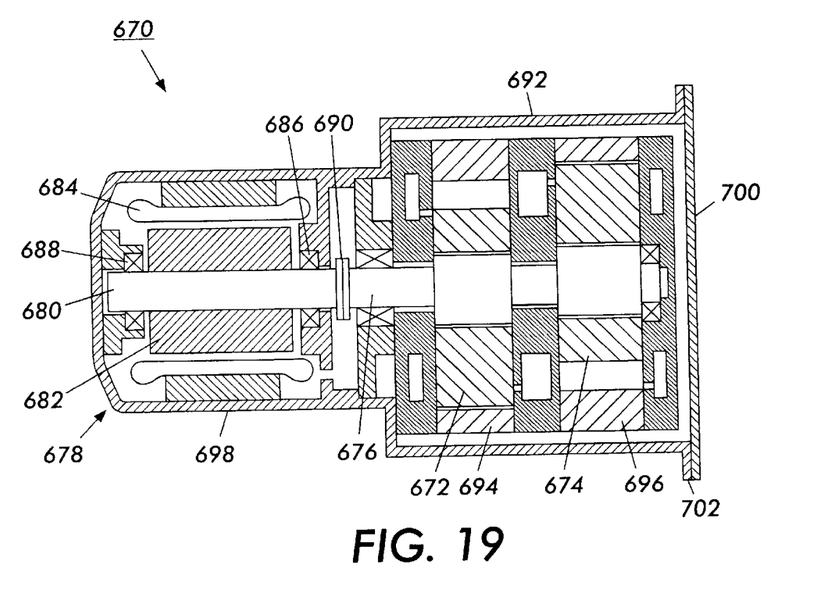
FIG. 19 is a sectional view of a guided rotor assembly with its drive motor enclosed within a hermetic system.

FIG. 19 illustrates an guided rotor assembly 670 comprised of a multiplicity of guided rotors 672 and 674. Shaft 676 is rotated by electric motor 678 which, in the embodiment depicted, is comprised of motor shaft 680, motor rotor 682, and stator 684 supported by bearings 686 and 688. The motor shaft 680 is directly coupled to compressor shaft 676 by means a coupling 690.

The compressor shaft 676 rotates one or more of rotors 672 and 674, which may be of the same size, a different size, of the same function, and/or of a different function.

The motor 678 is cooled by incoming gas (not shown), and such incoming gas is then passed to compressor 692, wherein it is distributed equally to the rotor assemblies 672 and 674, which are disposed within housings 694 and 696, respectively.

In the embodiment depicted in FIG. 19, the rotor assemblies 674 and 676 have substantially the same geometry and capacity. In another embodiment, not shown, the rotor assemblies 674 and 674 have different geometries and/or capacities.

Referring again to FIG. 19, it will be seen that the entire compressor and drive assembly is disposed within hermetic enclosure 698. The end flange 700 is form an interface 702 with enclosure 698 which is a hermetic seal.

Figure 20:
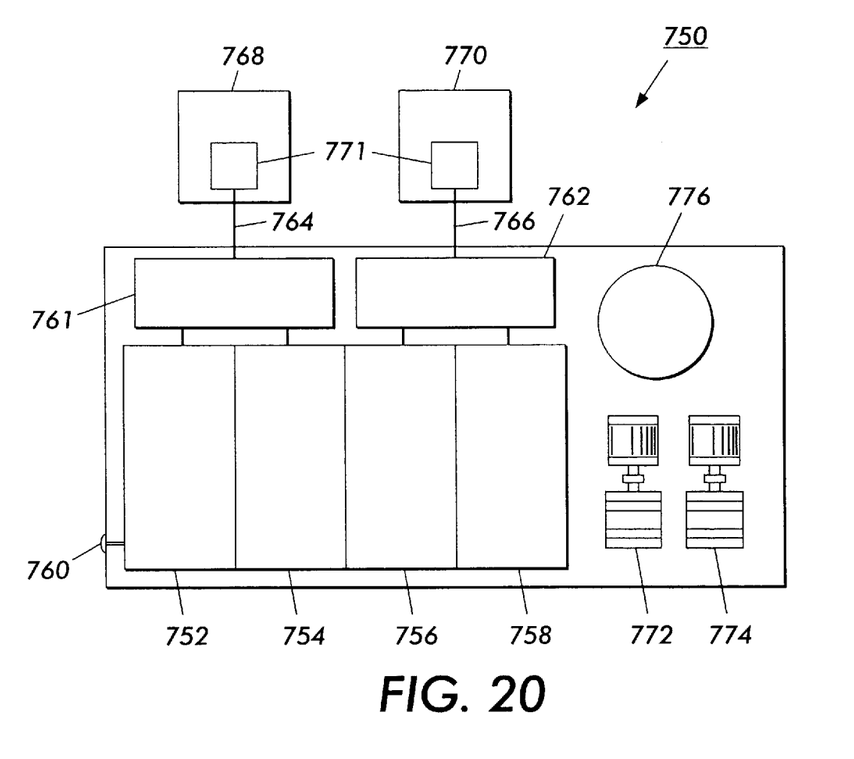
FIG. 20 is a schematic illustration of a microturbine electric generation and waste heat recovery system.

FIG. 20 is a schematic of an assembly 750 for generating electric power and recovering thermal energy for other useful work. Referring to FIG. 20, it will be seen that a multiplicity of micro turbines 752, 754, 756, and 758 are used to generate electricity which, in the embodiment depicted, is fed from the unit at outlet 760.

In one embodiment, a micro turbine such as those sold by the Capstone Turbine Corporation of Woodland Hills, California may be used. Thus, e.g., the Model 330 Capstone Micro Turbine may be used. Thus, e.g., one may use one or more of the micro turbines disclosed in U.S. Pat. Nos. 5,903,116, 5,899,673, 5,850,733, 5,819,524, and the like. The disclosure of each of these United States patents is hereby incorporated by reference into this specification.

Referring again to FIG. 20, the heat discharged from one or more of micro turbines 752, 754, 756, and/or 758 is passed to waste heat boilers 760 and/or 762, wherein the waste heat is used to heat fluid, such as water, and to preferably generate either hot water or steam. The hot fluid from waste heat boilers 760 and/or 762 is then passed via lines 764 and 766 to industrial processes 768 and 770. Any industrial or commercial processes which utilize heat energy may be used in the process. Thus, the waste heat may be used to heat or cool working space, inventory space, etc.; it may be used to heat chemical reagents; it may, in fact, be used in any process which requires heat. Conventional means, such as pipes, heat exchangers, and the like (see, e.g., heat exchanger 771) may be used to extract heat from the heated fluid.

In one embodiment, not shown, the exhaust gases from micro turbines 752, 754, 756, and/or 758 into the air inlet of a combustion boiler, or into any other device which can profitably utilize such hot gasses.

Referring again to FIG. 20, it will be seen that a multiplicity of guided rotor compressors 772 and 774 supply compressed natural gas to the micro turbines 752, 754, 756, and/or 758. Accumulator 776 accumulates compressed gas produced by compressors 772 and/or 774; and, as needed, it also may supply compressed gas to micro turbines 752, 754, 756, and 758.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A system for generating electricity comprised of a first turbo alternator and, operatively connected thereto, a first oil lubricated rotary positive displacement compressor system, wherein:

(a) said first turbo alternator is a Brayton cycle generator which is comprised of a compressor, a turbine, a combustor with a plurality of gaseous fuel nozzles and a plurality of air inlets, and a permanent magnet motor generator, (b) said first oil lubricated rotary positive displacement system is comprised of a rotary positive displacement compressor comprising a housing comprising a curved inner surface with a profile equidistant from a trochoidal curve, an eccentric mounted on a shaft disposed within said housing, a first rotor mounted on said eccentric shaft which is comprised of a first side, a second side, and a third side, a first partial bore disposed at the intersection of said first side and said second side, a second partial bore disposed at the intersection of said second side and said third side, a third partial bore disposed at the intersection of said third side and said first side, a first roller disposed and rotatably mounted within said first partial bore, a second roller disposed and rotatably mounted within said second partial bore, and a third roller disposed and rotatably mounted within said third partial bore, (c) said oil lubricated rotary positive displacement system is comprised of a receiving tank connected to said rotary positive displacement compressor, means for feeding gas to said rotary positive displacement compressor, means for feeding oil to said receiving tank, means for cooling a mixture of gas and oil, means for separating a mixture of gas and oil, and means for feeding oil to said rotary positive displacement compressor; and (d) said system for generating electricity is comprised of means for transmitting heat produced by said first turbo alternator to a boiler in which said waste heat is used to heat fluid, thereby producing a heated fluid.

2. The system as recited in claim 1, wherein each of said first roller, said second roller, and said third roller is a hollow roller.

3. The system as recited in claim 1, wherein each of said first roller, said second roller, and said third roller is a solid roller.

4. The system as recited in claim 1, wherein said first turbo alternator is comprised of a radial turbine.

5. The system as recited in claim 1, wherein said system is comprised of a second turbo alternator which is a Brayton cycle generator and which is comprised of a compressor, a turbine, a combustor with a plurality of gaseous fuel nozzles and a plurality of air inlets, and a permanent magnet motor generator.

6. The system as recited in claim 5, wherein system is comprised of a second oil lubricated rotary positive displacement system which is comprised of a rotary positive displacement compressor comprising a housing comprising a curved inner surface with a profile equidistant from a trochoidal curve, an eccentric mounted on a shaft disposed within said housing, a first rotor mounted on said eccentric shaft which is comprised of a first side, a second side, and a third side, a first partial bore disposed at the intersection of said first side and said second side, a second partial bore disposed at the intersection of said second side and said third side, a third partial bore disposed at the intersection of said third side and said first side, a first roller disposed and rotatably mounted within said first partial bore, a second roller disposed and rotatably mounted within said second partial bore, and a third roller disposed and rotatably mounted within said third partial bore.

7. The system as recited in claim 1, comprising means for transferring heat from said heated fluid.

8. The system as recited in claim 1, wherein said first oil lubricated rotary positive displacement compressor system is disposed within a hermetic enclosure.

9. The system as recited in claim 8, wherein an electric motor is disposed within said hermetic enclosure and is coupled to said first oil lubricated rotary positive displacement compressor system.

10. The system as recited in claim 1, wherein said first oil lubricated rotary positive displacement system is comprised of one shaft and two rotors.

* * * * *